(12) United States Patent
Ing et al.

(10) Patent No.: US 12,153,395 B2
(45) Date of Patent: Nov. 26, 2024

(54) SYSTEM AND METHOD FOR CORRECTING MACHINE LOAD EFFECT ON KINEMATIC ACCURACY

(71) Applicant: Pratt & Whitney Canada Corp., Longueuil (CA)

(72) Inventors: Visal Ing, Sainte-Julie (CA); Rachid Guiassa, Longueuil (CA); Joel Jean, Shannon (CA); Ghislain Hardy, Sainte-Julie (CA); Faical Ghezala, Saint-Hubert (CA)

(73) Assignee: Pratt & Whitney Canada Corp., Longueuil (CA)

( * ) Notice: Subject to any disclaimer, the term of this patent is extended or adjusted under 35 U.S.C. 154(b) by 353 days.

(21) Appl. No.: 17/670,157

(22) Filed: Feb. 11, 2022

(65) Prior Publication Data
US 2023/0259094 A1   Aug. 17, 2023

(51) Int. Cl.
*G05B 19/401* (2006.01)
*B23Q 23/00* (2006.01)

(52) U.S. Cl.
CPC .......... *G05B 19/401* (2013.01); *B23Q 23/00* (2013.01)

(58) Field of Classification Search
CPC .............. G05B 19/401; G05B 19/404; G05B 2219/37008; G05B 2219/41114; B23Q 23/00
See application file for complete search history.

(56) References Cited

U.S. PATENT DOCUMENTS

| | | |
|---|---|---|
| 4,791,575 A | 12/1988 | Watts, Jr. |
| 5,111,590 A | 5/1992 | Park |
| 7,533,574 B2 | 5/2009 | McMurtry |
| 8,607,466 B2 | 12/2013 | Pettersson |
| 8,868,367 B2 | 10/2014 | Merlo |
| 9,212,888 B2 | 12/2015 | Merlo |

(Continued)

FOREIGN PATENT DOCUMENTS

| | | | |
|---|---|---|---|
| EP | 2298499 A1 | 3/2011 | |
| EP | 2735928 A1 * | 5/2014 | ........... G05B 19/404 |
| EP | 2735928 B1 | 8/2018 | |

OTHER PUBLICATIONS

EP Search Report for EP Patent Application No. 23156138.2 dated Jul. 6, 2023.

*Primary Examiner* — Catherine T. Rastovski
*Assistant Examiner* — Yossef Korang-Beheshti
(74) *Attorney, Agent, or Firm* — Getz Balich LLC

(57) ABSTRACT

A method for calibrating a machining system includes providing the machining system which includes a base, a cantilevered arm, and a rotary table positioned at the second arm end of the cantilevered arm. The rotary table is rotatable relative to the cantilevered arm about a first axis. The first axis has a first unloaded position and a first unloaded orientation with the machining system in an unloaded condition. The method further includes installing a measurement artifact on the rotary table, measuring a first position of the measurement artifact, and installing a load on the rotary table. The first axis has a first loaded position and a first loaded orientation with the machining system in a loaded condition. The method further includes measuring a second position of the measurement artifact and determining a positional deviation of the second position from the first position.

19 Claims, 5 Drawing Sheets

(56) References Cited

U.S. PATENT DOCUMENTS

| | | |
|---|---|---|
| 10,898,982 B2 | 1/2021 | Hammond |
| 2012/0130531 A1* | 5/2012 | Gu .................... G05B 19/4015 |
| | | 700/193 |
| 2016/0114412 A1 | 4/2016 | Bosch |
| 2018/0065199 A1* | 3/2018 | Kido ...................... B23H 7/265 |
| 2022/0040775 A1* | 2/2022 | Taborelli .................. B23H 3/02 |

* cited by examiner

SYSTEM AND METHOD FOR CORRECTING MACHINE LOAD EFFECT ON KINEMATIC ACCURACY

TECHNICAL FIELD

This disclosure relates generally to workpiece machining assemblies and more particularly to systems and methods for calibrating machining systems for workpiece machining assemblies.

BACKGROUND OF THE ART

The machining of workpieces using computer numerical control (CNC) machining processes can require a substantial degree of precision in the positioning and movement of workpieces. In particular, the position and orientation of a workpiece relative to a machining system must be accurately controlled. In some cases, the positioning accuracy of a CNC system may be affected by one or more factors including, for example, a mass or shape of a workpiece. Some workpieces, such as those that will be machined to form components (e.g., turbine disks) for a gas turbine engine, may have a substantial mass which may impact the accuracy of a positioning system used to position and/or rotate the workpieces about or along one or more axes. Accordingly, systems and methods which improve machining accuracy of workpieces are needed.

SUMMARY

It should be understood that any or all of the features or embodiments described herein can be used or combined in any combination with each and every other feature or embodiment described herein unless expressly noted otherwise.

According to an aspect of the present disclosure, a method for calibrating a machining system includes providing the machining system. The machining system includes a base and a cantilevered arm including a first arm end and a second arm end. The first arm end of the cantilevered arm is movably attached to the base. The machining system further includes a rotary table positioned at the second arm end of the cantilevered arm. The rotary table is rotatable relative to the cantilevered arm about a first axis. The first axis has a first unloaded position and a first unloaded orientation with the machining system in an unloaded condition. The method further includes installing a measurement artifact on the rotary table, measuring a first position of the measurement artifact, and installing a load on the rotary table. The first axis has a first loaded position and a first loaded orientation with the machining system in a loaded condition. The method further includes measuring a second position of the measurement artifact and determining a positional deviation of the second position from the first position.

In any of the aspects or embodiments described above and herein, the method may further include determining the first loaded position and the first loaded orientation of the first axis based on the positional deviation.

In any of the aspects or embodiments described above and herein, the cantilevered arm may extend along a second axis. The method may further include determining a second loaded position and a second loaded orientation of the second axis with the machining system in the loaded condition.

In any of the aspects or embodiments described above and herein, the first axis may intersect the second axis.

In any of the aspects or embodiments described above and herein, the rotary table of the machining system may be positioned within a machining tank.

In any of the aspects or embodiments described above and herein, the measurement artifact may extend from a first artifact end mounted to the rotary table to a second artifact end. The second artifact end may be located outside of the machining tank.

In any of the aspects or embodiments described above and herein, the machining tank may include a dielectric fluid surrounding the machining system.

In any of the aspects or embodiments described above and herein, the load may be a workpiece. The method may further include machining the workpiece subsequent to determining the first loaded position and the first loaded orientation of the first axis.

In any of the aspects or embodiments described above and herein, the method may further include measuring a third position of the measurement artifact subsequent to machining a portion of the workpiece.

In any of the aspects or embodiments described above and herein, machining the workpiece may include applying a wire electric discharge machining (WEDM) process to the workpiece.

According to another aspect of the present disclosure, a machining assembly includes a machining system. The machining system includes a base and a cantilevered arm including a first arm end and a second arm end. The first arm end of the cantilevered arm is movably attached to the base. The machining system further includes a rotary table positioned at the second arm end of the cantilevered arm. The rotary table is rotatable relative to the cantilevered arm about a first axis. The machining assembly further includes a measurement artifact mounted to the rotary table and a computer numerical control (CNC) controller configured to control movement of the cantilevered arm and rotation of the rotary table.

In any of the aspects or embodiments described above and herein, the machining assembly may further include a machining tank. The rotary table may be positioned within the machining tank.

In any of the aspects or embodiments described above and herein, at least a portion of the measurement artifact may be located outside of the machining tank.

In any of the aspects or embodiments described above and herein, the machining tank may include a dielectric fluid surrounding the machining system.

In any of the aspects or embodiments described above and herein, the cantilevered arm may extend along a second axis.

In any of the aspects or embodiments described above and herein, the first axis may intersect the second axis.

In any of the aspects or embodiments described above and herein, the CNC controller may be configured to receive a first position of the measurement artifact with the machining system in an unloaded condition, receive a second position of the measurement artifact with the machining system in a loaded condition, and determine a positional deviation of the second position from the first position.

In any of the aspects or embodiments described above and herein, the CNC controller may be configured to determine a first loaded position and a first loaded orientation of the first axis with the machining system in the loaded condition.

In any of the aspects or embodiments described above and herein, the CNC controller may be configured to determine a second loaded position and a second loaded orientation of the second axis with the machining system in the loaded condition.

In any of the aspects or embodiments described above and herein, the machining assembly may further include a wire electric discharge machining (WEDM) system.

The present disclosure, and all its aspects, embodiments and advantages associated therewith will become more readily apparent in view of the detailed description provided below, including the accompanying drawings.

DETAILED DESCRIPTION

Figure 1:
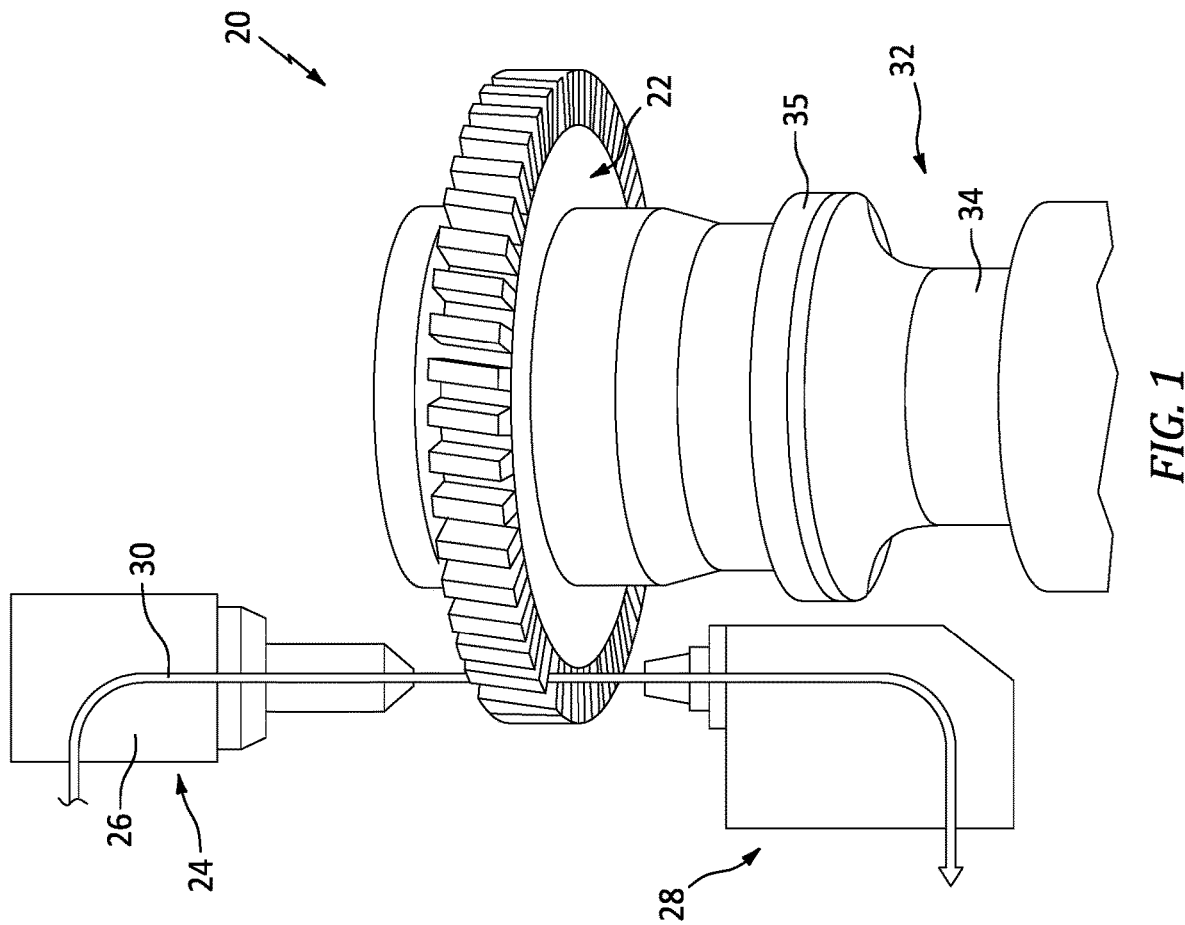
FIG. 1 illustrates a perspective view of a portion of a machining assembly, in accordance with one or more embodiments of the present disclosure.

FIG. 1 illustrates a perspective view of a portion of an exemplary machining assembly 20 for machining a workpiece 22. The machining assembly 20 of FIG. 1 includes a wire electric discharge machining (WEDM) system 24. The WEDM system 24 includes an upper member 26 and a lower member 28. In the WEDM system 24 of FIG. 1, a wire 30 is continuously fed from the upper member 26 to the lower member 28, during a machining operation. The motion of the wire 30 proximate the workpiece 22 generates sparks between the wire 30 and the workpiece 22 as the wire is fed from the upper member 26 to the lower member 28, thereby allowing the WEDM system 24 to cut the workpiece 22 as necessary to form a machined component.

The machining assembly 20 includes a machining system 32. A portion of the machining system 32 is illustrated in FIG. 1. The machining system 32 is configured to position the workpiece 22 relative to the WEDM 24 by moving the workpiece 22 relative to an x-axis, a y-axis, and a z-axis, as well as by rotating the workpiece 22 relative to one or more axes, as will be discussed in further detail. In FIG. 1, a disk-shaped workpiece 22 is installed on a pivotable surface (e.g., a rotary table 34) of the machining system 32. The disk-shaped workpiece 22 may be part of a turbine disk or other bladed disk, however, the present disclosure is not limited to any particular shape or configuration of the workpiece 22. The workpiece 22 may be mounted to rotary table 34 using fixturing 35 including fasteners (e.g., bolts) and/or other assembly components. Aspects of the present disclosure machining system 32 are described with reference to the WEDM system 24, however, the present disclosure is not limited to use with WEDM systems and may be used with other machining system configurations as well.

Figure 2:
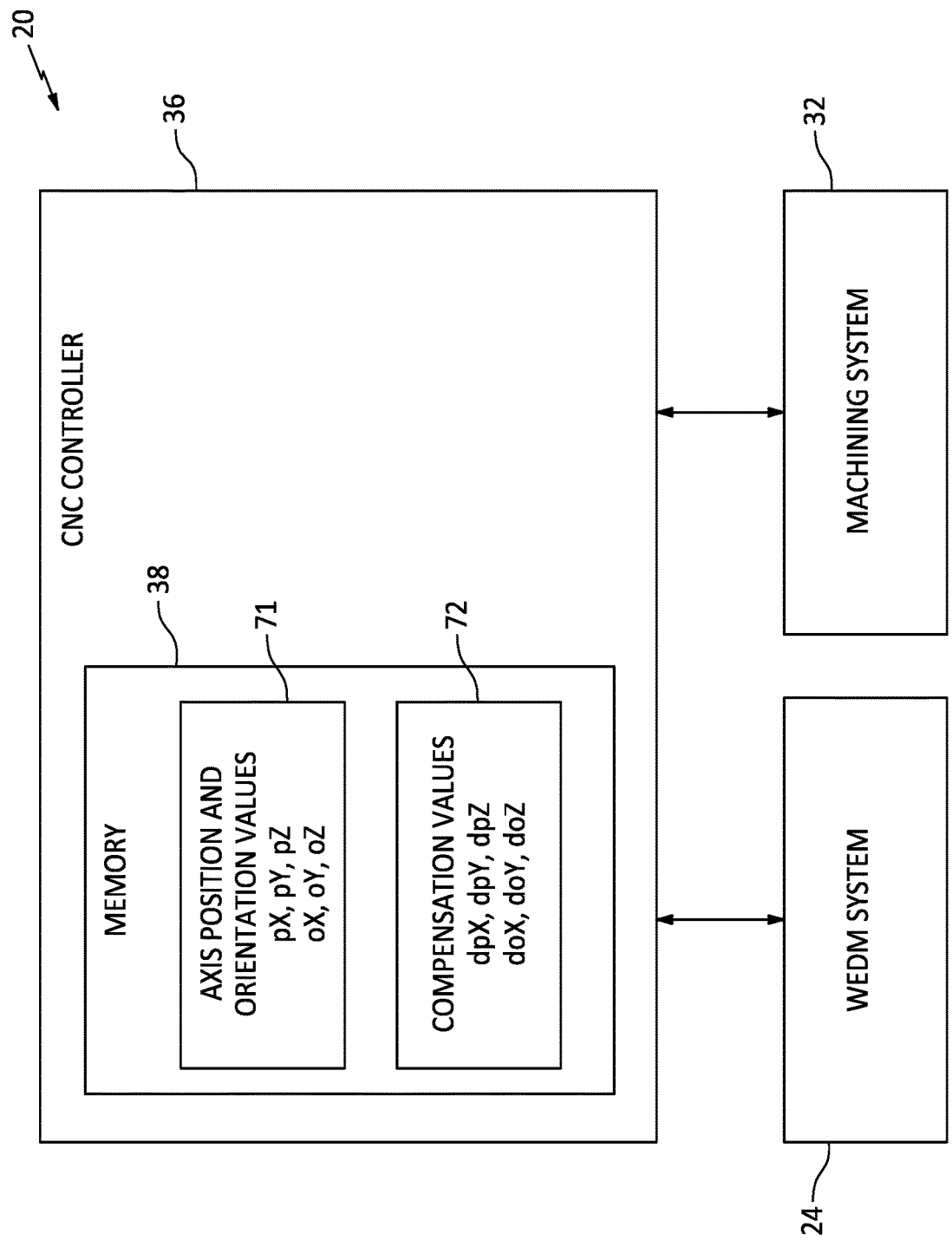
FIG. 2 illustrates a block diagram for a machining assembly, in accordance with one or more embodiments of the present disclosure.

Referring to FIG. 2, the machining assembly 20 may further include a computer numerical control (CNC) controller 36. The CNC controller 36 may be in signal communication with the WEDM system 24 and the machining system 32. The CNC controller 36 may include any type of computing device, computational circuit, or any type of process or processing circuit capable of executing a series of instructions that are stored in memory 38. The CNC controller 36 may include multiple processors and/or multicore CPUs and may include any type of processor, such as a microprocessor, digital signal processor, co-processors, a micro-controller, a microcomputer, a central processing unit, a field programmable gate array, a programmable logic device, a state machine, logic circuitry, analog circuitry, digital circuitry, etc., and any combination thereof. The instructions stored in memory 38 may represent one or more algorithms for controlling the aspects of the WEDM system 24 and/or the machining system 32, and the stored instructions are not limited to any particular form (e.g., program files, system data, buffers, drivers, utilities, system programs, etc.) provided they can be executed by the CNC controller 36. The memory 38 may be a non-transitory computer readable storage medium configured to store instructions that when executed by one or more processors, cause the one or more processors to perform or cause the performance of certain functions. The memory 38 may be a single memory device or a plurality of memory devices. A memory device may include a storage area network, network attached storage, as well a disk drive, a read-only memory, random access memory, volatile memory, non-volatile memory, static memory, dynamic memory, flash memory, cache memory, and/or any device that stores digital information. One skilled in the art will appreciate, based on a review of this disclosure, that the implementation of the CNC controller 36 may be achieved via the use of hardware, software, firmware, or any combination thereof. The CNC controller 36 may also include input (e.g., a keyboard, a touch screen, etc.) and output devices (a monitor, sensor readouts, data ports, etc.) that enable the operator to input instructions, receive data, etc.

Figure 3:
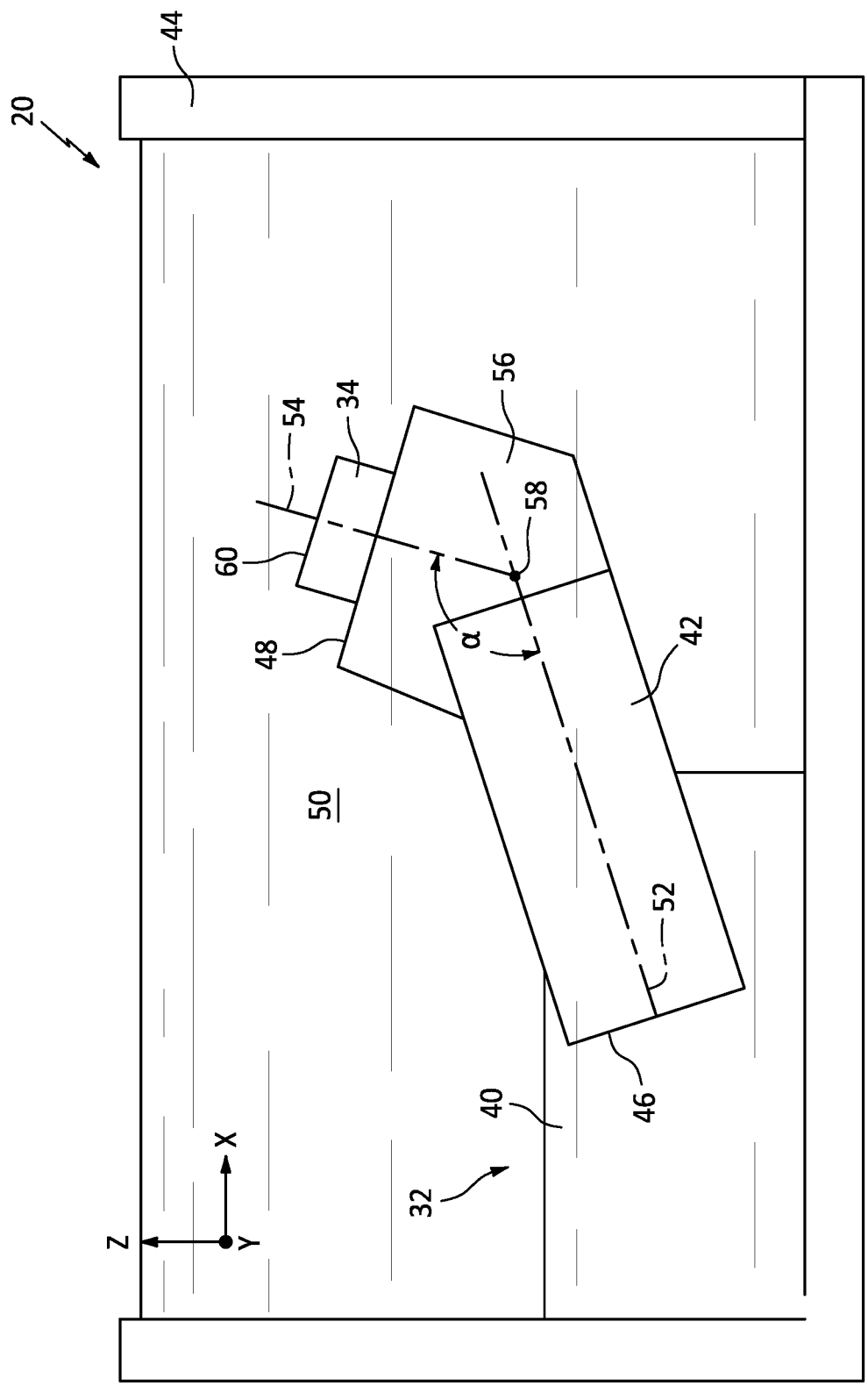
FIG. 3 illustrates a schematic view of a machining system, in accordance with one or more embodiments of the present disclosure.
Figure 4:
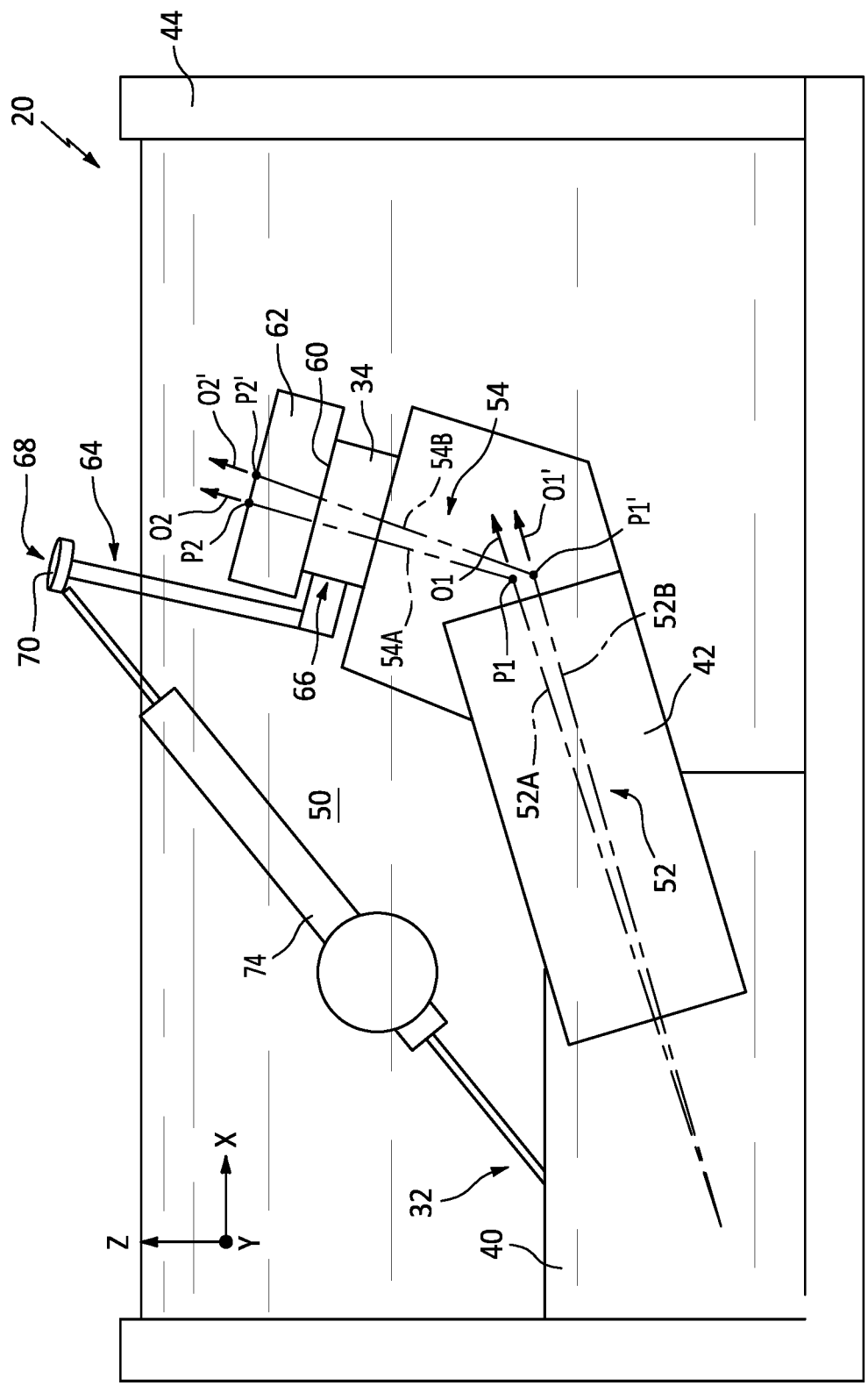
FIG. 4 illustrates a schematic view of the machining system of FIG. 3 including a measurement artifact, in accordance with one or more embodiments of the present disclosure.

Referring to FIGS. 3 and 4, the machining system 32 includes a base 40, a cantilevered arm 42, and the rotary table 34 positioned within a machining tank 44. The machining tank 44 may be filled with a dielectric fluid 50 (e.g., deionized water) which may be used to provide insulation against premature discharging of the WEDM system 24, cool machining equipment (e.g., the WEDM system 24) or a workpiece (e.g., the workpiece 22), or to assist in the disposal of material removed from a workpiece during machining. The cantilevered arm 42 includes a first arm end 46 and a second arm end 48. The cantilevered arm 42 extends along an axis 52. The cantilevered arm 42 is moveably connected to the base 40. For example, the first arm end 46 may be movably connected to the base 40. The machining system 32 may be configured, for example, to move the cantilevered arm 42 along one or more of the x-axis, the y-axis, and the z-axis and/or rotate the cantilevered arm 42 about the axis 52. In some embodiments, the machining system 32 may include all or portions of the WEDM system 24 such as the upper member 26 and/or the lower member 28.

The rotary table 34 is mounted to or otherwise positioned at the second arm end 48 of the cantilevered arm 42. The rotary table 34 is rotatable relative to the cantilevered arm 42 about an axis 54 (e.g., a rotational axis). In some embodiments, the axis 54 may intersect the axis 52 such that the axis 52 and the axis 54 define an angle $\alpha$ therebetween, however, the present disclosure is not limited to this particular configuration of the axes 52, 54. In some embodiments, the cantilevered arm 42 may include a rotational member 56 configured to control the orientation of the axis 52 relative to the axis 54. In other words, the rotational member 56 may rotate to control a magnitude of the angle $\alpha$ defined between the axis 52 and the axis 54. For example, the rotational member 56 may be configured to rotate about an axis 58. The axis 58 may extend substantially parallel to the axis 52 and/or the axis 54. The rotary table 34 includes a mounting surface 60. The mounting surface 60 is configured to support the workpiece 22 as well as associated fixturing and/or fasteners (e.g., bolts, clamps, etc.) used to securely mount the workpiece 22 to the mounting surface 60 of the rotary table 34.

FIG. 4 illustrates a load 62 mounted to the mounting surface 60 of the rotary table 34. The load 62 may include the workpiece 22 (see FIG. 1). The load 62 may further include the fixturing used to mount the load 62 to the mounting surface 60 or to otherwise support the load 62. As will be discussed in further detail, the load 62 may alternatively be a mock workpiece configured with a mass and center of mass location which is the same as or similar to a predetermined reference workpiece 22.

Due to the weight of the load 62 mounted to the rotary table 34, the cantilevered arm 42 and rotary table 34 may experience a positional shift, relative to the cantilevered arm 42 and rotary table 34 without the load 62 mounted to the rotary table 34. FIG. 4 illustrates the axis 52 of the cantilevered arm 42 in an unloaded condition 52A (hereinafter the "unloaded axis 52A") and in a loaded condition 52B (hereinafter the "loaded axis 52B"). Similarly, FIG. 4 illustrates the axis 54 of the rotary table 34 in an unloaded condition 54A (hereinafter the "unloaded axis 54A") and in a loaded condition 54B (hereinafter the "loaded axis 54B"). In other words, the unloaded axes 52A, 54A indicate an exemplary position of the axes 52, 54 when there is no load mounted to the rotary table 34. The loaded axes 52B, 54B indicate an exemplary position of the axes 52, 54 when the load 62 is mounted to the rotary table 34.

As can be understood from FIG. 4, the weight of the load 62 on the cantilevered arm 42 and the rotary table 34 causes a deviation of the position and orientation of the axis 52 and the axis 54 (e.g., the difference in position and orientation of the unloaded axes 52A, 54A and the loaded axes 52B, 54B shown in FIG. 4). The presence of the dielectric fluid 50 within the machining tank 44 may further impact the deviation of the position and orientation of the axes 52, 54 due to the Archimedes effect. During machining of a workpiece (e.g., the workpiece 22) mounted to the rotary table 34, the actual position and orientation of the axis 54 of the rotary table 34 should be precisely known to allow the CNC controller 36 to accurately position and/or rotate the workpiece relative to the machining assembly (e.g., the machining assembly 20). Deviation between the expected and the actual position and orientation of the axes 52, 54 can result in relative mispositioning of the workpiece relative to the machining assembly. Accordingly, the machining accuracy for the workpiece may be affected, potentially resulting in machined workpieces which may not be acceptable for their intended use (e.g., as machinery components).

The machining assembly 20 of FIG. 4 includes a measurement artifact 64 mounted to the rotary table 34. In some embodiments, the measurement artifact 64 may alternatively be mounted to the cantilevered arm 42. For example, the measurement artifact 64 may be directly or indirectly mounted to the rotary table 34 or the cantilevered arm 42. The measurement artifact 64 includes a first artifact end 66 and a second artifact end 68. The first artifact end 66 of the measurement artifact 64 of FIG. 4 is mounted to the rotary table 34. The second artifact end 68 is positioned outside of the machining tank 44 and associated dielectric fluid 50. In some embodiments, the second artifact end 68 may include an enlarged portion 70 which may be used as a measurement point for measuring the position and orientation of the measurement artifact 64. The enlarged portion 70 may include, for example, a sphere or disk shape, however, the present disclosure is not limited to any particular shape of the enlarged portion 70.

Figure 5:
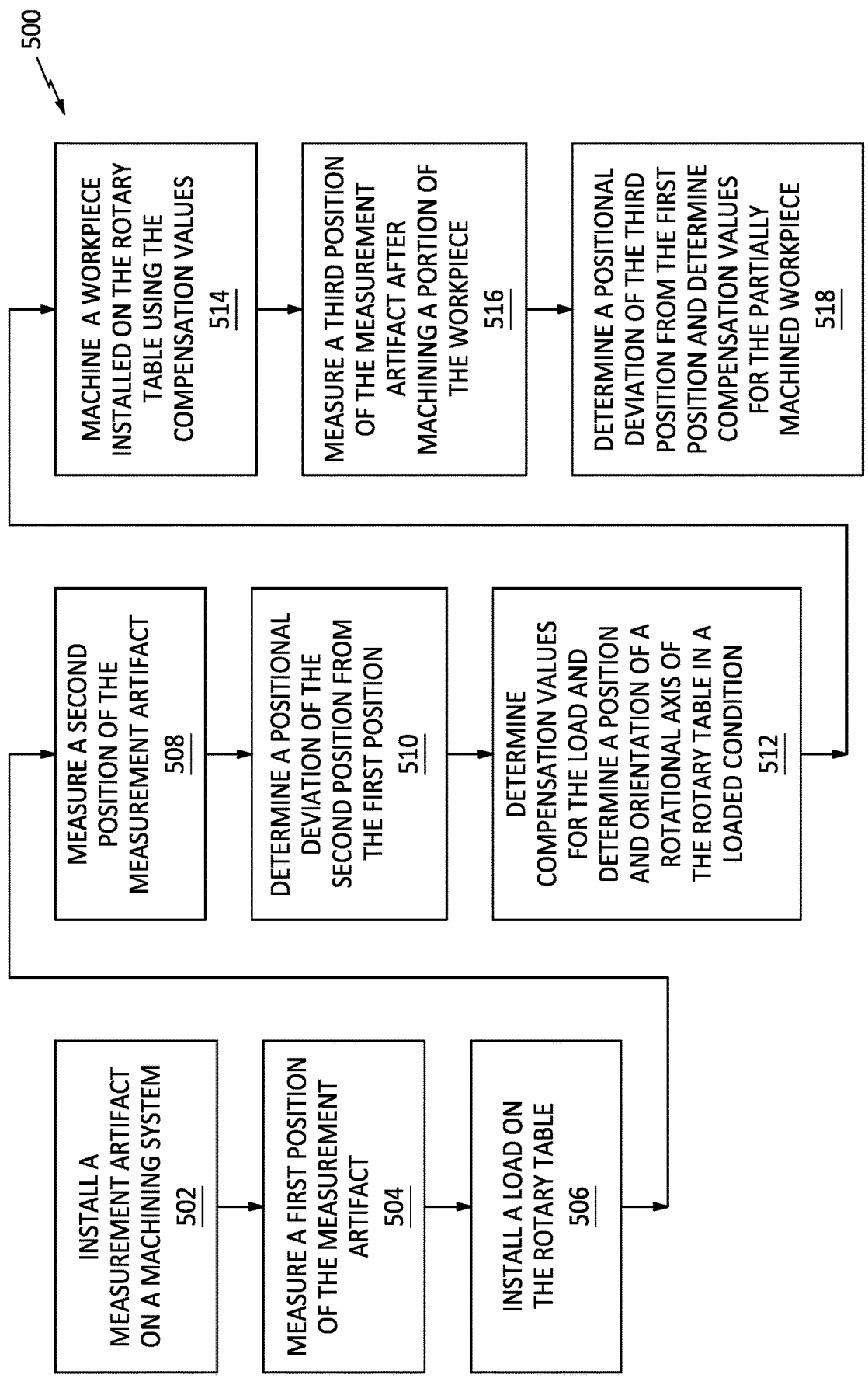
FIG. 5 illustrates flow chart of a method for calibrating a machining system, in accordance with one or more embodiments of the present disclosure.

Referring to FIGS. 2, 4, and 5, a method 500 for calibrating a machining system is provided. FIG. 5 illustrates a flowchart of the method 500. For ease of description, the method 500 is described below with reference to the machining assembly 20 including the CNC controller 36 and the machining system 32. The method 500, however, may alternatively be performed with other machining system configurations. Unless otherwise noted herein, it should be understood that the steps of method 500 are not required to be performed in the specific sequence in which they are discussed below and, in various embodiments, the steps of method 500 may be performed separately or simultaneously.

In Step 502, the measurement artifact 64 is installed on the machining system 32. For example, the measurement artifact 64 may be installed on the rotary table 34, as shown in FIG. 4. In some embodiments, the mass of the measurement artifact 64 may be assumed to have a negligible impact on the position and orientation of the axes 52, 54. In some embodiments, the mass and center of mass location (e.g., an x-y-z coordinate position of the center of mass) of the measurement artifact 64 may be provided as an input to the CNC controller 36 to compensate for the mass of the measurement artifact 64 when determining the position and orientation of the loaded axes 52B, 54B. The position and orientation of the axes 52, 54 in the unloaded condition may have axis position and orientation values 71 which may be stored, for example, in memory 38 of the CNC controller 36 (see FIG. 2). For example, the position and orientation of the axes 52, 54 may be represented by one or more known positions P1-$n$ along the unloaded axes 52, 54 and/or one or more known orientations O1-$n$ along the unloaded axes 52, 54. The known positions P1-$n$ may be expressed as x-y-z coordinate positions (e.g., $p^x$, $p^y$, $p^z$). The known orientations O1-$n$ may be expressed as an angle of the axis 52 and/or the axis 54 relative to a reference axis (e.g., a vertical axis). Alternatively, the known orientations O1-$n$ of the axis 52 and/or the axis 54 may be expressed using x-y-z coordinate positions (e.g., $o^x$, $o^y$, $o^z$) or a slope of the respective axes 52, 54 between two or more coordinate positions along the respective axes 52, 54. The present disclosure is not limited to any particular means for expressing the positions P1-$n$, P1'-$n'$ and orientations O1-$n$, O1'-$n'$ of the axis 52 and/or the axis 54. As shown in FIG. 4, a first known position P1 may correspond to an intersection between the unloaded axis 52 and the unloaded axis 54 and a second known position P2 may correspond to an intersection between the unloaded axis 54 and a surface of the load 62. As also shown in FIG. 4, a first known orientation O1 may correspond to an orientation of the unloaded axis 52A relative to the known position P1 and a second known orientation O2 may correspond to an orientation of the unloaded axis 54A relative to the known position P2. It should be understood, however, that the known positions P1, P2 and orientations O1, O2 are exemplary, and the present disclosure is not limited to the particular known positions P1, P2 and orientations O1, O2 illustrated in FIG. 4.

In Step 504, the position of the measurement artifact 64 is measured prior to installation of the load 62 on the machining system 32. In other words, the position of the measurement artifact 64 is measured with the axes 52, 54 in an unloaded condition (e.g., the unloaded axes 52A, 54A).

The position of the measurement artifact 64 may be determine from one or more portions of the measurement artifact 64 such as, for example, the enlarged portion 70 located at the second artifact end 68 of the measurement artifact 64. The position and orientation of the measurement artifact 64 may be determined relative to a datum such as an origin (i.e., a reference point) of the x-axis, y-axis, and z-axis. For example, the position and orientation of the measurement artifact 64 may be expressed using one or more positions represented by x-y-z coordinates. The one or more coordinate positions of the measurement artifact 64 may be provided as inputs to the CNC controller 36. The position and orientation of the measurement artifact 64 may be measured using, for example, a coordinate measuring machine (CMM) touch probe, a dial indicator, a laser scanner, and the like, and the present disclosure is not limited to any particular process or equipment for determining the position and orientation of the measurement artifact 64. As shown in FIG. 4, the position of the measurement artifact 64 may be measured from one or more fixed positions using a dial indicator 74. The dial indicator 74 may be positioned to measure a distance between the measurement artifact 64 and one or more fixed positions on the machining system 32 (e.g., the base 40), the machining tank 44, other components of the machining assembly 20, etc.

In Step 506, the load 62 is installed on the rotary table 34. As previously discussed, the load 62 may be the workpiece 22. Depending on the size and/or shape of the workpiece 22, however, it may be difficult to install the workpiece 22 with the measurement artifact 64 mounted to the rotary table 34. Accordingly, the load 62 may instead be a mock workpiece which has a different shape than the workpiece 22 but a mass and center of mass location which are the same as or similar to the workpiece 22. The mock workpiece, therefore, may accommodate the positioning of the measurement artifact 64 on the machining system 32.

In Step 508, the position of the measurement artifact 64 is measured subsequent to installation of the load 62 on the machining system 32. In other words, the position of the measurement artifact 64 is measured with the axes 52, 54 in a loaded condition (e.g., the loaded axes 52B, 54B). The position and orientation of the measurement artifact 64 may be measured and expressed as previously discussed. For example, the position and orientation of the measurement artifact 64 may be expressed using one or more positions represented by x-y-z coordinates. The one or more coordinate positions may be provided as inputs to the CNC controller 36.

In Step 510, the positional deviation of the measurement artifact 64 is determined. The CNC controller 36 may determine the difference in the one or more positions of the measurement artifact 64, with the machining system 32 in the unloaded condition and the loaded condition. The positional deviation may be expressed as a difference in the x-y-z coordinates associated with the one or more positions of the measurement artifact 64 in the unloaded condition and the loaded condition of the machining system 32.

In Step 512, the position and orientation of one or both of the loaded axis 52B and the loaded axis 54B may be determined by the CNC controller 36 using the measured positional deviation of the measurement artifact 64. The CNC controller 36 may determine compensation values 72 based on the measured positional deviation of the measurement artifact 64. The compensation values 72 may be used by the CNC controller 36 to determine an estimated position and orientation of the axes 52, 54 with the workpiece 22 installed on the rotary table 34. For example, known values of the position (e.g., P1, P2, ... Pn) and orientation (e.g., O1, O2, ... On) of the unloaded axes 52A, 54A may be modified using the compensation values 72 to determine one or more estimated positions (P1'-n') and/or one or more estimated orientations (O1'-n') of the loaded axes 52B, 54B with the load 62 installed on the rotary table 34. As shown in FIG. 4, a first estimated position P1' for the loaded axes 52B, 54B may correspond to the known position P1 of the unloaded axes 52A, 52B modified by the compensation values 72. Similarly, a second estimated position P2' of the loaded axis 54B may correspond to the known position P2 of the unloaded axis 54A modified by the compensation values 72. As also shown in FIG. 4, a first estimated orientation O1' for the loaded axis 52B may correspond to the known orientation O1 of the unloaded axis 52A modified by the compensation values 72. Similarly, a second estimated orientation O2' for the loaded axis 54B may correspond to the known orientation O2 of the unloaded axis 54A modified by the compensation values 72. The values of the estimated positions P1'-n' and orientations O1'-n' of the axes 52, 54 may be stored as the axis position and orientation values 71 in memory 38 of the CNC controller 36 and may be expressed similar to the known positions P1-n and orientations O1-n, as previously discussed.

In some embodiments, steps 502-512 may be repeated as necessary to determine compensation values 72 associated with various weights or weight ranges of the load 62. For example, compensation values 72 may be determined using a plurality of loads 62 (e.g., mock workpieces) which are representative of a reference workpiece 22 at various stages of machining. As described above, the compensation values 72 may be stored in memory 38 of the CNC controller 36. Accordingly, the machining system 32 can be compensated based on a particular weight or weight range of the workpiece 22 as the workpiece 22 undergoes machining. Additionally or alternatively, in some embodiments, additional compensation values 72 may be determined for various weights or weight ranges of the load 62 based on interpolation between known and/or estimated positions P1-n, P1'-n' and/or orientations O1-n, O1'-n' of the axes 52, 54.

The compensation values 72 may be expressed as a difference in the x-y-z coordinates associated with the position and orientation of the unloaded axes 52A, 54A and the respective loaded axes 52B, 54B. In some embodiments, the estimated position and orientation of the axis 52 and/or the axis 54 may be the same or substantially the same as the determined position and orientation of the loaded axis 52B and/or the loaded axis 54B. In some other embodiments, however, the compensation values 72 may be additionally modified to account for measurement and machining factors including, but not limited to, fluid characteristics of the dielectric fluid 50, differences (mass, center of mass location, etc.) between the workpiece 22 and an associated mock workpiece, position measurement tolerances, etc. An inspection of the machined workpiece 22 may be performed subsequent to the completion of machining. In some embodiments, the compensation values 72 may be additionally modified based on the inspection of the machined workpiece 22. For example, the compensation values 72 may be additionally modified based on any observed deviations of the machined workpiece 22 from the specifications for the machined workpiece 22. The compensation values 72 may be stored in the memory 38 of the CNC controller 36 for use with machining instances of the workpiece 22 (see FIG. 2).

In Step 514, the workpiece 22 is machined. The workpiece 22 may be machined, for example, using the WEDM system 24. In some embodiments, Step 514 may include installing the workpiece 22 on the rotary table 34 in preparation for machining. The CNC controller 36 controls the machining system 32 which effects positioning of the workpiece 22 and rotation of the workpiece 22 about the axis 54. The CNC controller 36 controls the positioning and rotation of the workpiece 22 based on the estimated position and orientation of the axis 52 and the axis 54 which are determined using the compensation values 72. Step 514 may include machining the entire workpiece 22. Alternatively, Step 514 may include machining only a portion of the workpiece 22.

In Step 516, one or more positions of the measurement artifact 64 may optionally be measured after machining at least a portion of the workpiece 22 installed on the rotary table 34. The position and orientation of the measurement artifact 64 may be measured and expressed as previously discussed. For example, the position and orientation of the measurement artifact 64 may be expressed using one or more positions represented by x-y-z coordinates. The one or more coordinate positions may be provided as inputs to the CNC controller 36. As the workpiece 22 is machined (e.g., in Step 514), the mass and the center of mass location for the workpiece 22 will necessarily change due to the removal of material from the workpiece 22. Accordingly, the position and orientation of the axis 52 and the axis 54 may also change during and/or throughout the machining of the workpiece 22.

In Step 518, the positional deviation of the measurement artifact 64, as a result of the machining process, may be determined. Specifically, the positional deviation of the measurement artifact 64 between the position of the measurement artifact 64 with the machining system 32 in an unloaded condition and the position of the measurement artifact 64 with the workpiece 22 in a partially machined condition, may be determined. The CNC controller 36 may determine the difference in the one or more positions of the measurement artifact 64, as previously discussed. The positional deviation may be expressed as a difference in the x-y-z coordinates associated with the one or more positions of the measurement artifact 64. The positional deviation of the one or more coordinate positions may be provided as inputs to the CNC controller 36. As previously discussed, the positional deviation may be used by the CNC controller 36 to determine additional compensation values 72 which may, in turn, be used to determine estimated positions (P1'-n') and orientations (O1'-n') of the axis 52 and the axis 54 at various machining stages for the workpiece 22. The additional compensation values 72 may be stored in the memory 38 of the CNC controller 36. Steps 514, 516, and 518 may be repeated as necessary until machining of the workpiece 22 is complete. For example, Steps 514, 516, and 518 may be repeated for various predetermined weights or weight ranges of the workpiece 22 during machining of the workpiece 22.

It is noted that various connections are set forth between elements in the preceding description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. It is further noted that various method or process steps for embodiments of the present disclosure are described in the following description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Accordingly, the present disclosure is not to be restricted except in light of the attached claims and their equivalents.

The invention claimed is:

1. A method for calibrating a machining system, the method comprising:
    installing a measurement artifact on a rotary table of the machining system, the rotary table rotatable about a first axis having a first unloaded position and a first unloaded orientation;
    measuring a first position of the measurement artifact;
    installing a load on the rotary table, the first axis having a first loaded position and a first loaded orientation with the load installed on the rotary table;
    measuring a second position of the measurement artifact; and
    calibrating the machining system by determining a positional deviation of the second position from the first position, determining the first loaded position and the first loaded orientation of the first axis based on the positional deviation, and determining a second loaded position and a second loaded orientation of a second axis of a cantilevered arm with the load installed on the rotary table, the cantilevered arm connected to the rotary table.

2. The method of claim 1, wherein the first axis intersects the second axis.

3. The method of claim 1, wherein the rotary table of the machining system is positioned within a machining tank during the steps of measuring a first position of the measurement artifact and measuring a second position of the measurement artifact.

4. The method of claim 3, wherein the measurement artifact extends from a first artifact end mounted to the rotary table to a second artifact end, and wherein the second artifact end is located outside of the machining tank.

5. The method of claim 3, wherein the machining tank includes a dielectric fluid surrounding the machining system.

6. The method of claim 1, wherein the load is a workpiece and wherein the step of calibrating the machining system further includes machining the workpiece subsequent to determining the first loaded position and the first loaded orientation of the first axis.

7. The method of claim 6, wherein the step of calibrating the machining system further includes measuring a third position of the measurement artifact subsequent to machining a portion of the workpiece.

8. The method of claim 6, wherein machining the workpiece includes applying a wire electric discharge machining (WEDM) process to the workpiece.

9. A machining assembly comprising:
a machining tank;
a machining system comprising:
    a base;
    a cantilevered arm including a first arm end and a second arm end, the first arm end of the cantilevered arm movably attached to the base; and
    a rotary table positioned at the second arm end of the cantilevered arm, the rotary table rotatable relative to the cantilevered arm about a first axis, the rotary table positioned within the machining tank;
a measurement artifact mounted to the rotary table, at least a portion of the measurement artifact located outside of the machining tank; and
a computer numerical control (CNC) controller configured to control movement of the cantilevered arm and rotation of the rotary table.

10. The machining assembly of claim 9, wherein the machining tank includes a dielectric fluid surrounding the machining system.

11. The machining assembly of claim 9, wherein the cantilevered arm extends along a second axis.

12. The machining assembly of claim 11, wherein the first axis intersects the second axis.

13. The machining assembly of claim 11, wherein the CNC controller is configured to:
receive a first position of the measurement artifact with the machining system in an unloaded condition;
receive a second position of the measurement artifact with the machining system in a loaded condition; and
determine a positional deviation of the second position from the first position.

14. The machining assembly of claim 13, wherein the CNC controller is configured to determine a first loaded position and a first loaded orientation of the first axis with the machining system in the loaded condition.

15. The machining assembly of claim 14, wherein the CNC controller is configured to determine a second loaded position and a second loaded orientation of the second axis with the machining system in the loaded condition.

16. The machining assembly of claim 9, further comprising a wire electric discharge machining (WEDM) system.

17. A method for calibrating a machining system, the method comprising:
installing a measurement artifact on a rotary table of the machining system, the rotary table rotatable about a first axis having a first unloaded position and a first unloaded orientation, the measurement artifact extends from a first artifact end mounted to the rotary table to a second artifact end, the second artifact end located outside of a machining tank;
measuring a first position of the measurement artifact with the rotary table of the machining system positioned within the machining tank;
installing a load on the rotary table, the first axis having a first loaded position and a first loaded orientation with the load installed on the rotary table;
measuring a second position of the measurement artifact with the rotary table of the machining system positioned within the machining tank; and
calibrating the machining system by determining a positional deviation of the second position from the first position.

18. The machining assembly of claim 10, wherein a compensation value is stored in memory of the CNC controller, the compensation value comprising a difference in x-y-z coordinates associated with a position and an orientation of a first position of the measurement artifact with the machining system in an unloaded condition and a second position of the measurement artifact with the machining system in a loaded condition.

19. The machining assembly of claim 18, wherein the compensation value includes fluid characteristics of the dielectric fluid, positional measurement tolerances, or mass differences between a workpiece and an associated mock workpiece.

* * * * *